US007093202B2

(12) United States Patent
Saund et al.

(10) Patent No.: US 7,093,202 B2
(45) Date of Patent: Aug. 15, 2006

(54) METHOD AND SYSTEM FOR INTERPRETING IMPRECISE OBJECT SELECTION PATHS

(75) Inventors: Eric Saund, San Carlos, CA (US); Edward Lank, San Francisco, CA (US); David J. Fleet, Menlo Park, CA (US); James V. Mahoney, Palo Alto, CA (US); Daniel L. Larner, San Jose, CA (US); Thomas P. Moran, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 791 days.

(21) Appl. No.: 10/104,523

(22) Filed: Mar. 22, 2002

(65) Prior Publication Data

US 2003/0179202 A1    Sep. 25, 2003

(51) Int. Cl.
*G06F 3/00* (2006.01)
*G06T 11/20* (2006.01)

(52) U.S. Cl. .................. 715/863; 715/764; 345/442

(58) Field of Classification Search ............... 715/863, 715/700, 764, 812, 860–862, 961; 345/441–442, 345/179; 382/187, 189; 389/209, 309, 311
See application file for complete search history.

(56) References Cited

U.S. PATENT DOCUMENTS

| | | | | |
|---|---|---|---|---|
| 5,347,295 A * | 9/1994 | Agulnick et al. | ........... | 345/156 |
| 5,485,565 A | 1/1996 | Saund et al. | | |
| 5,513,309 A | 4/1996 | Meier et al. | | |
| 5,523,775 A * | 6/1996 | Capps | ........................ | 345/179 |
| 5,691,748 A * | 11/1997 | Fukuzaki | .................... | 345/173 |
| 5,760,773 A | 6/1998 | Berman et al. | | |
| 5,796,406 A * | 8/1998 | Shigematsu et al. | ........ | 715/863 |
| 5,796,866 A * | 8/1998 | Sakurai et al. | .............. | 382/187 |
| 6,097,392 A * | 8/2000 | Leyerle | ....................... | 715/863 |
| 6,181,836 B1 | 1/2001 | Delean | | |
| 6,340,967 B1 * | 1/2002 | Maxted | ....................... | 345/179 |
| 6,459,442 B1 * | 10/2002 | Edwards et al. | ............. | 715/863 |
| 6,651,221 B1 * | 11/2003 | Thompson et al. | ......... | 715/541 |
| 6,664,991 B1 * | 12/2003 | Chew et al. | ................. | 715/863 |
| 2001/0045949 A1 * | 11/2001 | Chithambaram et al. | ... | 345/418 |
| 2002/0015064 A1 * | 2/2002 | Robotham et al. | .......... | 345/863 |

FOREIGN PATENT DOCUMENTS

| | | |
|---|---|---|
| EP | 0 782 066 A2 | 7/1997 |
| EP | 0816 998 A2 | 1/1998 |

OTHER PUBLICATIONS

MicroSoft Paint 4.0 (Screendumps, pp. 1-3, 1999).*
Gross (Ambiguous Intentions: a Paper-like Interface for Creative Design; ACM Proceedings of the 9th annual ACM symposium on User interface software ad technology; Nov. 1996; pp. 183-192).*
Xiangshi Ren and Shinji Moriya, "Improving Selection Performance on Pen-Based Systems: A Study of Pen-Based Interaction for Selection Tasks," ACM Transactions on Computer-Human Interaction, Sep. 2000, pp. 384-416, vol. 7, No. 3, New York City.

* cited by examiner

*Primary Examiner*—Sy D. Luu
(74) *Attorney, Agent, or Firm*—Linda M. Robb (57) ABSTRACT

A graphical input and display system having a user interface for selecting and creating image object elements includes input devices permitting a user to manipulate elements of electronic images. A processor, connected to the system, receives requests for various image object selection operations and also accesses a memory structure. The system memory structure includes a user interaction module, which allows a user to select image objects, an image object selection module for interpreting imprecise image object selection paths, and data memory.

18 Claims, 6 Drawing Sheets

METHOD AND SYSTEM FOR INTERPRETING IMPRECISE OBJECT SELECTION PATHS

CROSS REFERENCE TO RELATED APPLICATIONS

The following copending applications, U.S. application Ser. No. 10/104,804, filed Mar. 22, 2002, titled "Method and System for Overloading Loop Selection Commands in a System for Selecting and Arranging Visible Material in Document Images", U.S. application Ser. No. 10/104,396, filed Mar. 22, 2002, titled "Method for Gestural Interpretation in a System for Selecting and Arranging Visible Material in Document Images", and U.S. application Ser. No. 10/104,805, filed Mar. 22, 2002, titled "System and Method for Editing Electronic Images", are assigned to the same assignee of the present application. The entire disclosures of these copending applications are totally incorporated herein by reference in their entirety.

INCORPORATION BY REFERENCE

The following U.S. patents are fully incorporated herein by reference: U.S. Pat. No. 5,485,565 to Saund et al. ("Gestural Indicators for Selecting Graphic Objects"); U.S. Pat. No. 5,513,309 to Meier et al. ("Graphic Editor User Interface for a Pointer-Based Computer System"); and U.S. Pat. No. 5,760,773 to Berman et al. ("Methods and Apparatus for Interacting with Data Objects Using Action Handles").

BACKGROUND OF THE INVENTION

This invention relates generally to user interfaces to computational devices, and more particularly to applications in which displayed objects are selected and arranged in document images.

Two types of interactive drawing/sketching/editing applications are currently in use, both of which support creation of new image material, through draw operations, and selection and manipulation of existing material, through editing operations. The types of interactive applications are distinguished by the emphasis placed on "sketch" and "editing" operations. In an image "editing" program, selection and manipulation of image objects is the primary activity. Therefore, stylus or mouse interaction is designed primarily to interpret stylus input as selection gestures, and the default interpretation of mouse or stylus activity is selection of existing image objects for manipulation. Tools for drawing objects are provided by auxiliary command objects, usually menus.

In a "sketch" program, however, the primary activity is the "draw" operation. To facilitate the sketching process, it is important for users to be able to quickly execute a series of markings such as handwritten or sketched strokes, without having to perform a menu initiation command at every stroke. These programs are designed such that draw operations can be the default interpretation of mouse or stylus activity. The disadvantage to this type of program is that when priority is placed on draw operations, selection operations become demoted and require explicit menu choices or button clicks to invoke a selection, which impedes the smooth flow of multiple selection and manipulation operations.

In both types of interactive applications, it can be very difficult to select and move, delete, or otherwise modify salient collections of markings at will. In particular, users are sometimes imprecise in the ways that they draw encircling gestures to select image objects for further manipulation. They may unintentionally clip off a piece of an image object they intend to select. At other times, they may actually intend to split off the very same piece of this image object. One of the major drawbacks to existing graphical editors is their inability to interpret selection gestures in light of precomputed perceptual objects, so that imprecise gestures may be interpreted to either deliver the literal objects defined by the gesture, or the perceptually significant objects identified in the precomputation stage.

U.S. Pat. No. 5,485,565 to Saund et al. titled "Gestural Indicators for Selecting Graphic Objects" discloses a graphical imaging system, in which the rough location, size and shape of objects in the image is summarized by a first characteristic descriptor, representing a parametric "pose" computed for each object. A second characteristic descriptor, for example a "gesture matching" function, is provided in order to select the single object, or the set of objects, that best comports with the user's selection gesture. When most closely matched, these key characteristic descriptors permit simple and natural user gestures to distinguish among a large set of graphic objects that may overlap both spatially. User gestures can be simple slashes passing through the object, or quick, coarse approximations of objects' shapes.

U.S. Pat. No. 5,513,309 to Meier et al. titled "Graphic Editor User Interface for a Pointer-Based Computer System" discloses a graphical editor arranged to permit the user to edit selected graphic objects by highlighting the objects and moving them with editing handles. A bounding box is also drawn about the selected portions of the object. In various aspects of the invention, the user is permitted to edit the object by executing specific actions, including resizing, duplicating, distorting and moving either the entire object or only selected portions. After any of the editing operations is performed, the display is updated to reflect changes made during the editing step.

U.S. Pat. No. 5,760,773 to Berman et al. titled "Methods and Apparatus for Interacting with Data Objects Using Action Handles" teaches a central processing unit coupled to a pointer control device such as a pen, stylus or mouse, that permits the user to selectively position a pointer and activate an action handle on a display associated with a data object. Activation of the action handle signals the central processing unit of selections associated with the data object. Tapping or clicking on the action handle causes display of a context menu containing at least one command that may be invoked with respect to the data object. Dragging the action handle indicates movement or dragging of the action handle and the corresponding data object for an operation associated with dragging such as drag-and-drop.

The present invention offers a new tool for computer assisted drawing, one that provides users with the ability to make imprecise selection gestures while the application applies certain rules and image analysis operations to infer the user's intent.

SUMMARY OF THE INVENTION

Briefly stated, and in accordance with one aspect of the present invention, there is disclosed herein a graphical input and display system having a user interface for selecting and creating image object elements and includes input devices permitting a user to manipulate elements of electronic images. A processor, connected to the system, receives requests for various image object selection operations and also accesses a memory structure. The system memory structure includes a user interaction module, which allows a user to select image objects, an image object selection module for interpreting imprecise image object selection paths, and data memory.

In another aspect of the invention, there is disclosed a method for utilizing a user interface on a graphical input and display system for interpreting imprecise image object selection paths. After image material is selected, the system evaluates the characteristics of the selection path and also evaluates the proximity of the image material to the selection gesture. The image objects affected by the image object selection gesture are manipulated to identify those image objects to be selected.

In yet another aspect of the invention, there is provided an article of manufacture in the form of a computer usable medium having computer readable program code embodied in the medium. When the program code is executed by the computer, the computer usable medium causes the computer to perform method steps for interpreting imprecise image object selection gestures. The program readable code causes the computer to evaluate carefulness along an image object selection path which has been input by a user. The program code then causes the computer to form a tolerance tunnel, which includes an inner tunnel boundary and an outer tunnel boundary. The image objects affected by the selection gesture are then manipulated to determine which image objects are selected.

In another aspect of the invention, there is provided a memory for storing data for access by a program being executed on a computer for interpreting imprecise image object selection gestures. The memory includes an input image data structure and a primary image objects data structure. A selection path data structure is also stored in the memory, as is a tolerance tunnel data structure, which defines the tolerance tunnel identified for each imprecise image object selection gesture. The object boundary data structure and selected objects data structure are also stored within the memory.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Disclosed herein is a method for interpreting imprecise selection paths in a system for selecting and arranging visible material in document images. In the following description numerous specific details are set forth in order to provide a thorough understanding of the present invention. It would be apparent, however, to one skilled in the art to practice the invention without such specific details. In other instances, specific implementation details such as parsing techniques for extracting characters from a document image, have not been shown in detail in order not to unnecessarily obscure the present invention.

As will become apparent in the description below, the present invention finds particular advantage in editing text and line art contained in an image. Documents which are faxed or which are copied on a digital copier typically involve images that contain primarily text and graphics. As described with respect to the prior art, it is common that in order to edit any of the text contained in the image, extraneous processing such as Optical Character Recognition (OCR) or the placement of image information into layers must be performed. As will become apparent, the present invention minimizes the need for extraneous processing and provides added flexibility to defining both text and graphical image information so as to allow the editing of a wider range of textual and graphical data in an image.

Figure 1:
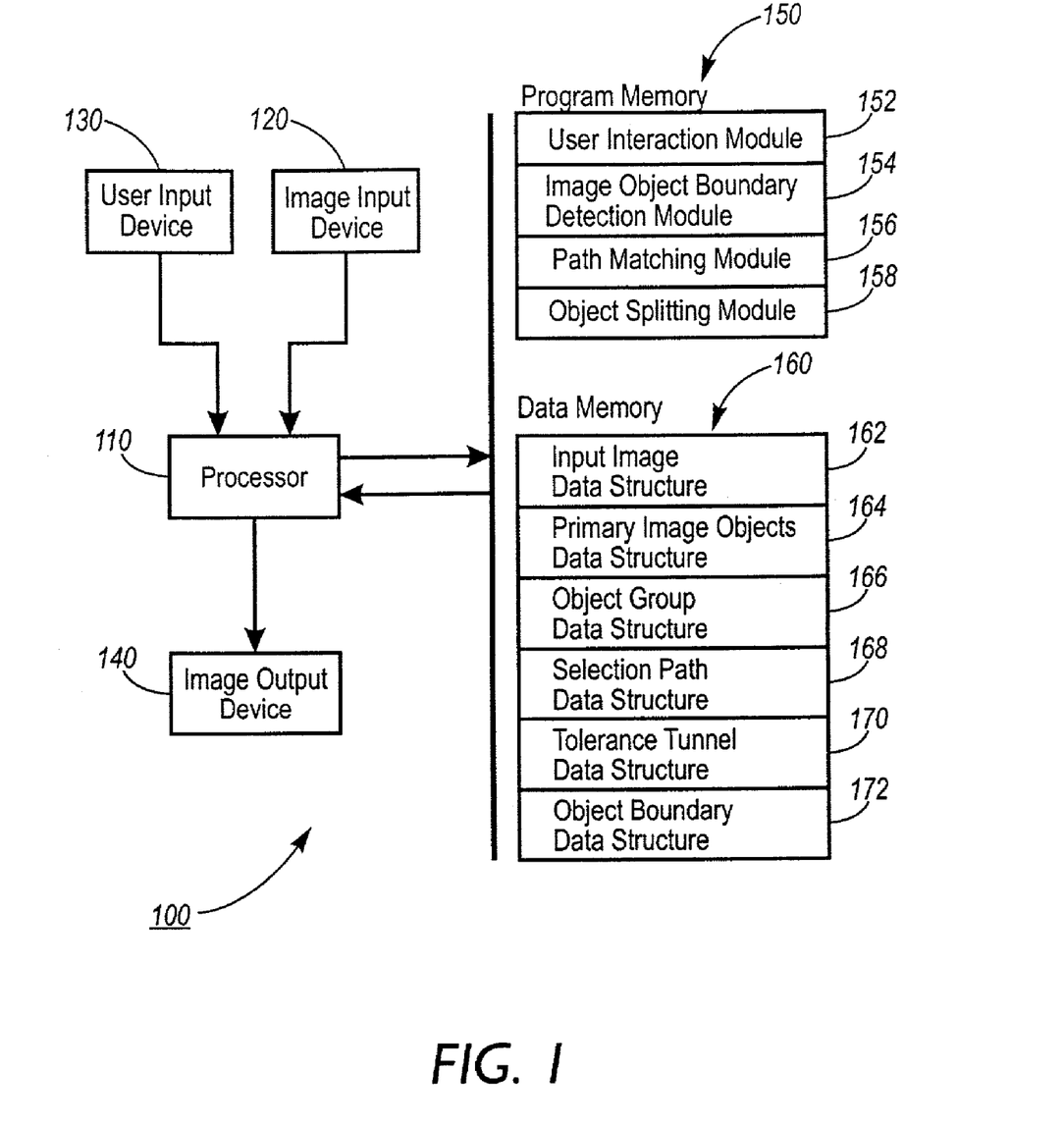
FIG. 1 is a block diagram showing general components of a system that can interpret imprecise selection paths according to the invention.

Referring now to FIG. 1, system 100 includes processor 110, connected to receive signals from image input device 120 and user input device 130. Image input device 120 could be a scanner, a facsimile receiver or other image receiver, a camera, or other appropriate device or could be a part of local or remote memory that stores an image in digital form. User input device 130 could, for example, be a keyboard with a mouse. Processor 110 can also be connected to image output device 140, such as a screen display, a printer, a facsimile transmitter or other image transmitter, or a part of local or remote memory that can store an image in digital form.

Processor 110 is also connected to access program memory 150 and data memory 160. Program memory 150 includes user interaction module 152, image object boundary detection module 154, path matching module 156, and may also include an optional object splitting module 158. Data memory 160 includes image input data structure 162, primary image objects data structure 164, object group data structure 166, selection path data structure 168, tolerance tunnel data structure 170, object boundary data structure 172, and selected objects data structure 174.

Figure 2:
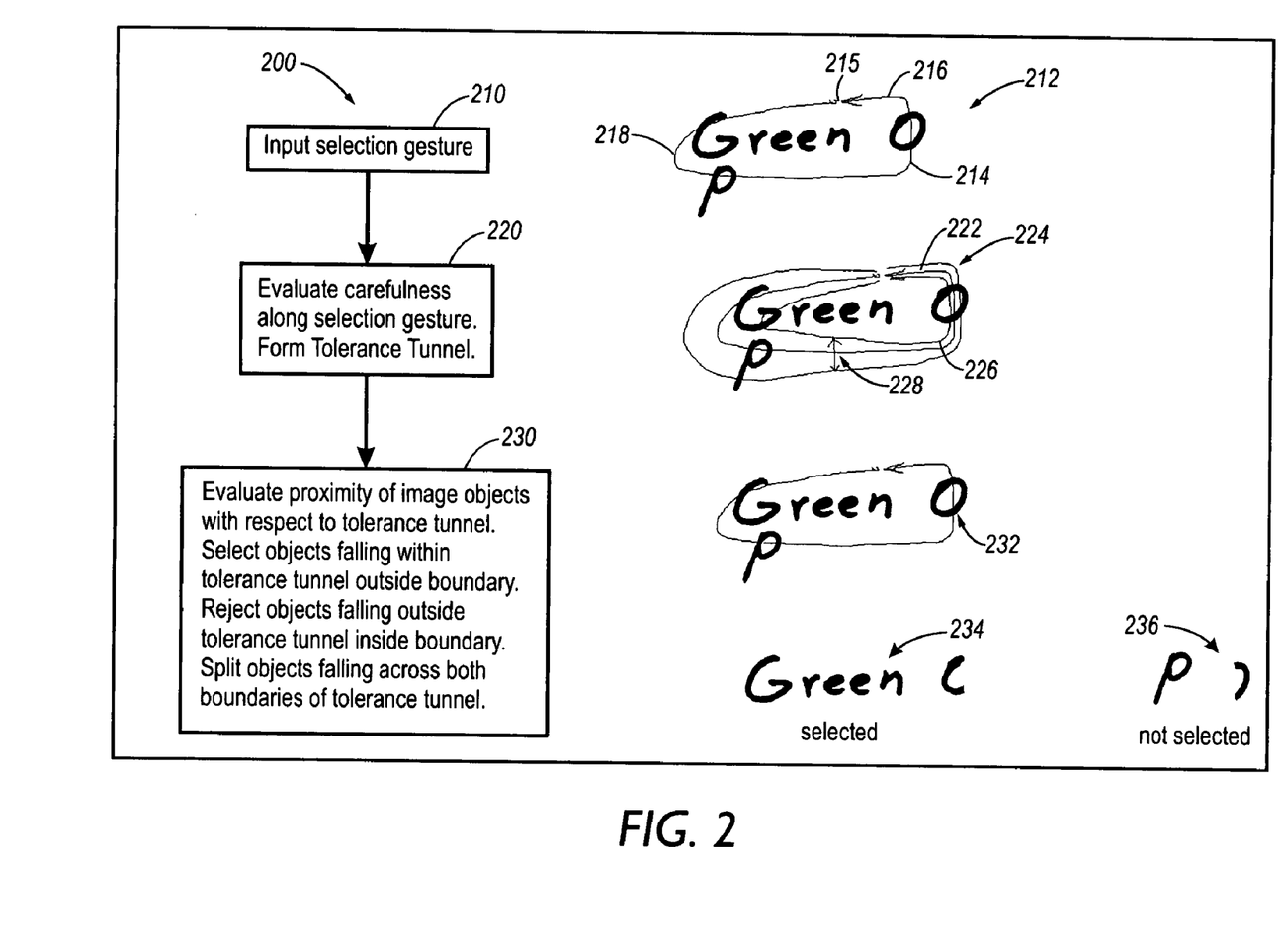
FIG. 2 is a flow chart showing steps in interpreting an imprecise selection path according to one embodiment of the present invention.

FIG. 2 illustrates one embodiment of the method for interpreting imprecise selection gestures in situations in which image objects are presented as independent image objects in a display. In FIG. 2 flowchart 200 shows the steps for interpreting imprecise gestures in this situation and the illustrations beside the flowchart show examples of the processing steps. Initially, a display contains the characters "G", "r", "e", "e", "n", "O" and "P" at example 212. At step 210, a user inputs a selection gesture, shown as path 216 in example 212. In this example, the gesture begins at point 215 and ends at the arrow. On the left side of path 216, approaching and leaving point 218, the path has high velocity, and the path has low velocity on the right side of path 216, approaching and leaving point 214. The user interaction module collects the path of the user's gesture and passes it to step 220 for evaluation as to carefulness along the selection gesture path. At each location along the selection gesture, the user's application of gesture drawing carefulness is evaluated. Various approaches may be used to evaluate carefulness, as will be appreciated by those skilled in the art. One example approach is application of the expression $$T = p(v/r'),$$

where P is a constant taking the value 10,000, v is velocity in pixels per second, and r' is given by $$\min(r, \max\_R),$$

where r is the radius of curvature at that location along the path, and max_R is a constant taking the value 800. This definition of carefulness yields a Tolerance Factor, T, in units of pixels. This value is a tolerance on the distance from the selection path permitted for image objects that would otherwise be split by a careful selection gesture. Thus carefulness approaches a minimum value of 0 pixels when the velocity is small or the radius of curvature is high, and it approaches a maximum value of approximately 50 pixels when path velocity is large and the path is relatively straight. The tolerance factor is used to define the inner boundary and outer boundary with respect to the selection path. In this example, these boundaries form a "tolerance tunnel", whose center axis is the selection path and whose width is the tolerance factor. Although in this example a tolerance tunnel is utilized to describe a bounded region, numerous other techniques may be similarly utilized and are fully contemplated and embraced within the scope of this invention. In the example, selection path 222 is bounded by a tolerance tunnel defined by tolerance tunnel paths 224 and 226. The tolerance tunnel approaches a minimum as it passes along the right side of selection path 222, where the gesture velocity was low; it approaches a maximum as it passes along the left side of selection path 222, where the gesture velocity was high. The tolerance factor is shown as tolerance tunnel width 228.

At step 230 each foreground image object is considered with respect to the tolerance tunnel. If an image object is found to lie entirely inside the outer boundary of the tolerance tunnel, then that object is selected. If an image object is found to lie entirely outside the inner boundary of the tolerance tunnel, then that object is rejected. If the dimensions of the image object extend beyond both boundaries of the tolerance tunnel, then the image object is split according to the selection path, and only the portion inside the path is selected. Optionally, this method may be implemented in such a way that image objects are not split, but are either selected or rejected from selection based on the area of the object falling inside the outer tolerance tunnel boundary versus outside the inner tolerance tunnel boundary, or other similar criteria. In the example, the objects "G", "r", "e", "e" and "n" lie entirely inside the outer boundary 224 of the tolerance tunnel and are selected. The object "P" lies entirely outside the inner boundary 226 of the tolerance tunnel, and is rejected. The object "O" extends beyond both boundaries of the tolerance tunnel and is split according to the selection path at 232. The resulting set of selected objects is shown at 234 and the resulting set of not selected objects is shown at 236.

Figure 3:
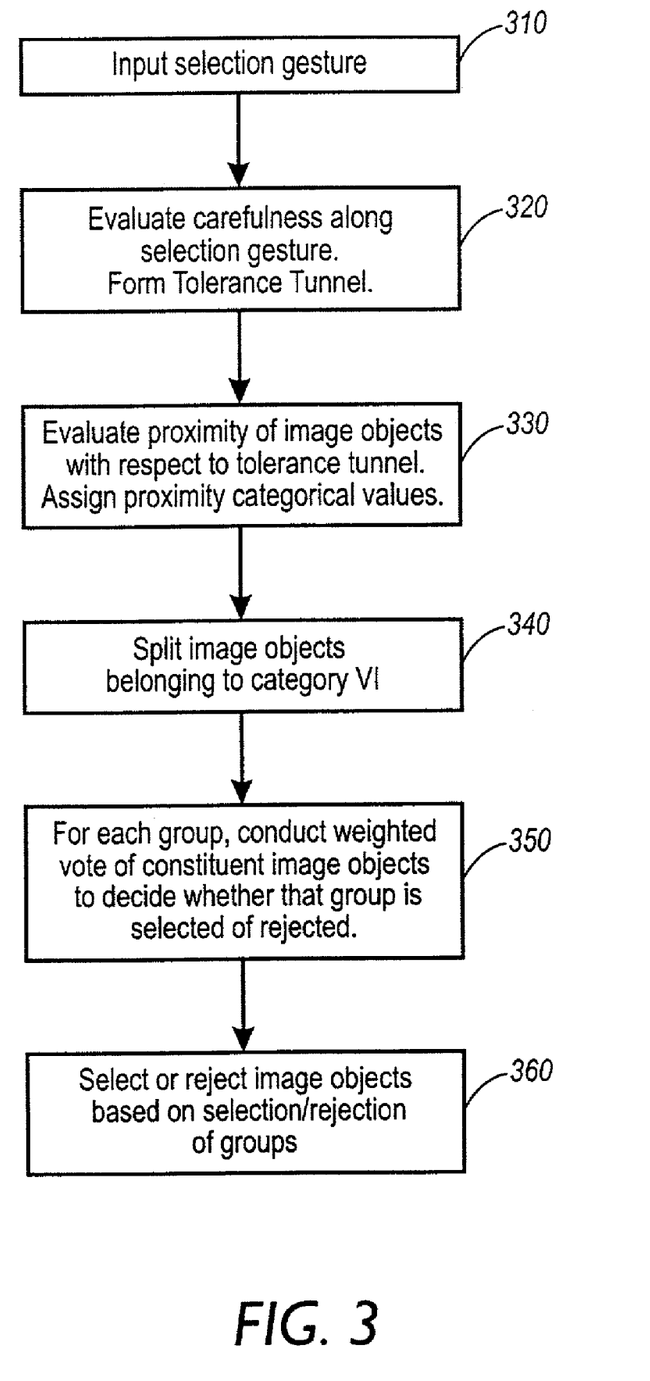
FIG. 3 is a flow chart showing steps in interpreting an imprecise selection path according to another embodiment of the present invention.
Figure 4:
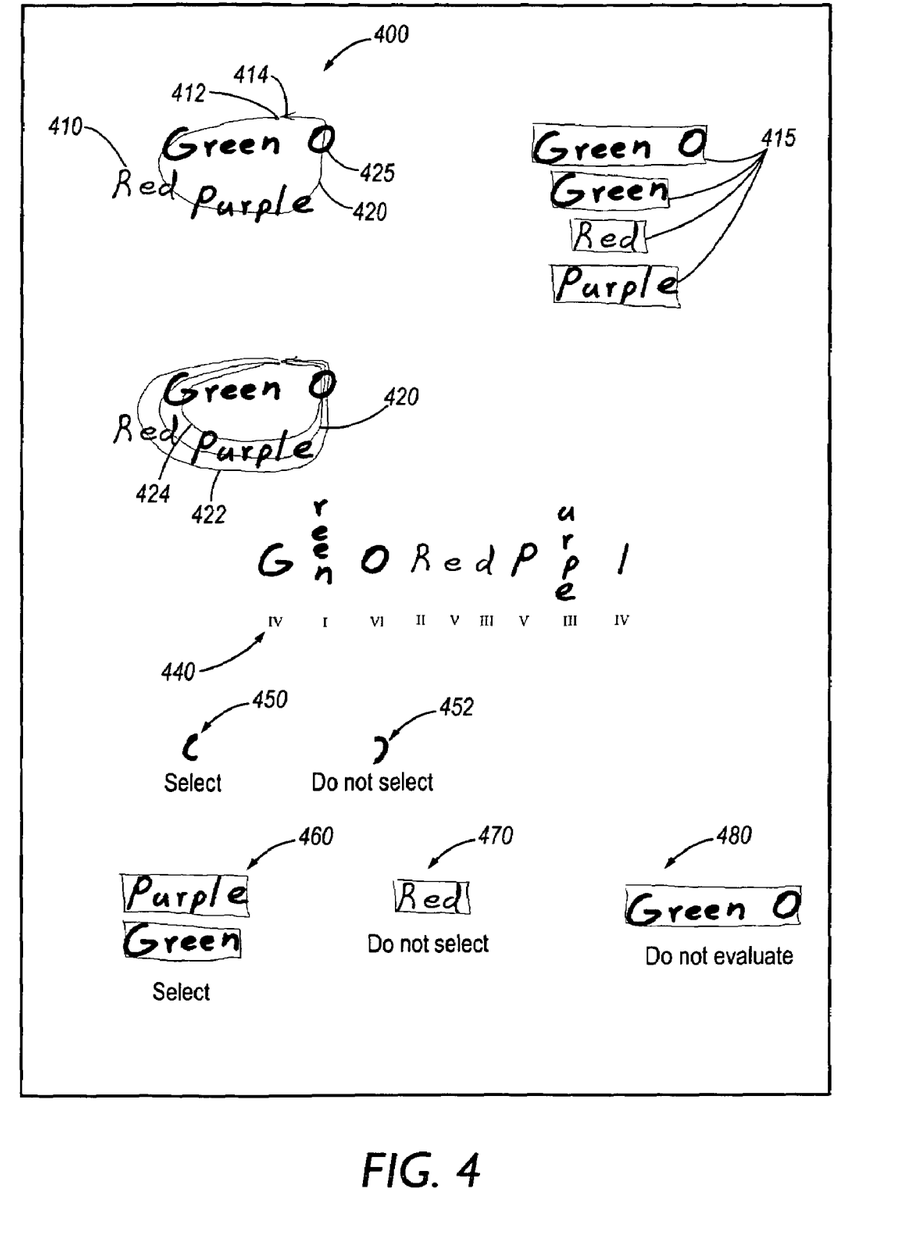
FIG. 4 illustrates the processing steps according to the embodiment of the present invention of FIG. 3.

FIGS. 3 and 4 illustrate another embodiment of the method for interpreting imprecise selection gestures in situations in which image objects may belong to groups. In FIG. 3 flowchart 300 shows the steps for interpreting imprecise gestures in this situation and FIG. 4 illustrates and example of the processing steps. Initially, a display may contain characters 410 forming the words "Green", "O", "Red" and "Purple", in the arrangement shown at 400 in FIG. 4. The system data memory contains data structures indicating that the characters form four groups, as illustrated. Numerous types of data structures may perform this function, including lists, arrays, and sets of pointers. At step 310 in FIG. 3, the user interaction module collects the path of the user's gesture and passes that information to step 320, in which carefulness along the selection gesture is evaluated. In the example shown in FIG. 4, the gesture begins at point 412 and ends at arrow 414. Path 420 has high velocity on the left side and bottom of the path, but low velocity on the right side of path 420, where it crosses the "O", as shown at location 425.

Referring now to FIG. 3, at step 320, at each location along the selection gesture, the user's degree of gesture drawing carefulness is evaluated. A tolerance factor is computed at each location along the selection gesture, and a tolerance tunnel is formed, as described hereinabove. This step is illustrated in FIG. 4, where gesture 420 is the user's selection path which is bounded by inner tolerance tunnel boundary 424 and outer tolerance tunnel boundary 422.

At step 330 in FIG. 3, each image object is evaluated with respect to the selection gesture path and the tolerance tunnel representing selection gesture carefulness. Each image object is assigned a categorical value depending on its proximity to the two tolerance tunnel boundaries. One possible set of categorical values may include I: inside the inner tolerance tunnel boundary;
II: outside the outer tolerance tunnel boundary;
III: between the inner and outer tolerance tunnel boundaries;
IV: spans the inner tolerance tunnel boundary;
V: spans the outer tolerance tunnel boundary; or
VI: spans both tolerance tunnel boundaries.

This step is illustrated in FIG. 4 at chart 430. As shown in the chart, "reen" fall inside the inner tolerance boundary 424 and are in category I. "R" falls outside outer tolerance tunnel boundary 422 and resides in category II. Objects "d" and "urpe" lie between inner and outer tolerance tunnel boundaries 424 and 422 and are in category III. Objects "G", "P" and "l" span inner tolerance tunnel boundary 424 and reside in category IV. Object "e" spans outer tolerance tunnel boundary 422, placing it in category V, while object "O" spans both tolerance tunnel boundaries, placing it in category VI.

Referring again to FIG. 3, at step 340 objects assigned to category VI are split according to the selection gesture path. The portions of these objects falling inside the selection gesture path are selected. This is illustrated in FIG. 4, where object "O" has been split and partial object 450 has been selected and partial object 452 was not selected.

At step 350 in FIG. 3, each remaining group is evaluated in turn, and all of the image objects in the group are selected or rejected based, for example, on a weighted vote for that group. The weighting of each vote is the pixel area of the image object. Each image object votes as follows, according to its tunnel proximity category:

| Category | Vote |
|----------|------|
| I | 2 |
| II | −2 |
| III | 0 |
| IV | 1 |
| V | −1 |

At step 360 group selection/rejection votes are used to assign selection/rejection decisions to individual objects. For each group, if the weighted vote is greater than 0, then all of the image objects comprising that group are selected. If the weighted vote is less than 0, then none of these objects are selected. If some image object belongs to more than one group and these groups are not either all selected or all rejected, then a second weighted vote is taken of all the groups to which the image object belongs. The weighting is the pixel area of all image objects forming the group. Groups that are selected vote the value 1, groups that are not selected vote the value −1. If the result is greater than 0, then the object in question is selected; if the result is less than 0, then the object in question is not selected. This is illustrated in FIG. 4, which shows the groups "Purple" and "Green" 460 as selected and the group "Red" 470 as not selected. The group "Green O" 480 is not evaluated.

Figure 5:
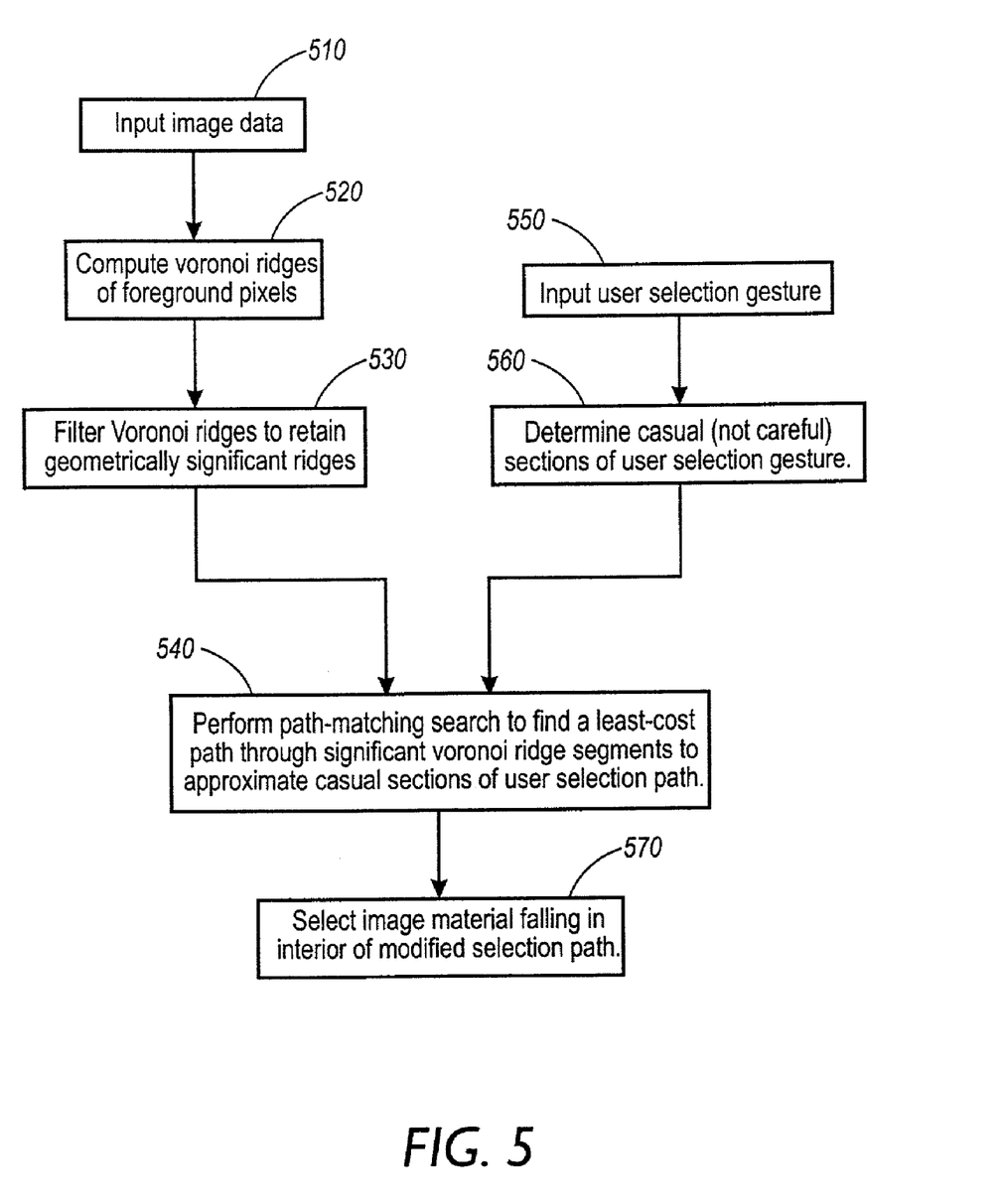
FIG. 5 is a flow chart showing steps in interpreting an imprecise selection path according to yet another embodiment of the present invention.

FIG. 5 illustrates another embodiment of the method for interpreting imprecise selection gestures in situations in which the image material to be selected exists as undifferentiated image objects, such as connected components, characters, words, lines of text, or individual figures. This method finds beneficial application when the image is represented as a single raster bitmap containing foreground image objects on a field of background pixel values. In FIG. 500 flowchart 300 shows the steps for interpreting imprecise gestures in this situation. Input image data is received at step 510. In this embodiment, prior to or subsequent to the user performing a selection operation, boundaries between perceptual image objects are computed at step 520 using various techniques of computational geometry, for example the Distance Transform and the Voronoi diagram, both of which are well known in the art. Local maxima (ridges) of the distance transform, or ridges provided by the Voronoi diagram, or an equivalent, are then passed through a filter at step 530 to retain only significant ridges. Persons skilled in the art are aware of techniques for discarding insignificant ridge points whose direction vectors to generating points fall at an acute angle.

When the user's selection gesture is input at step 550, points along the gesture are evaluated for degree of carefulness at step 560. For complete selection gestures or portions of selection gestures whose carefulness value falls below a threshold, an attempt is made to find a path through significant Voronoi ridges that approximates the selection path, at step 540. This may be accomplished through use of a variant on the A* search technique called path-matching, described in U.S. Pat. No. 5,485,565 "Gestural Indicators for Selecting Graphic Objects" cited hereinabove. This path is used finally to define the selection region used to select foreground objects for subsequent processing at step 570.

Figure 6:
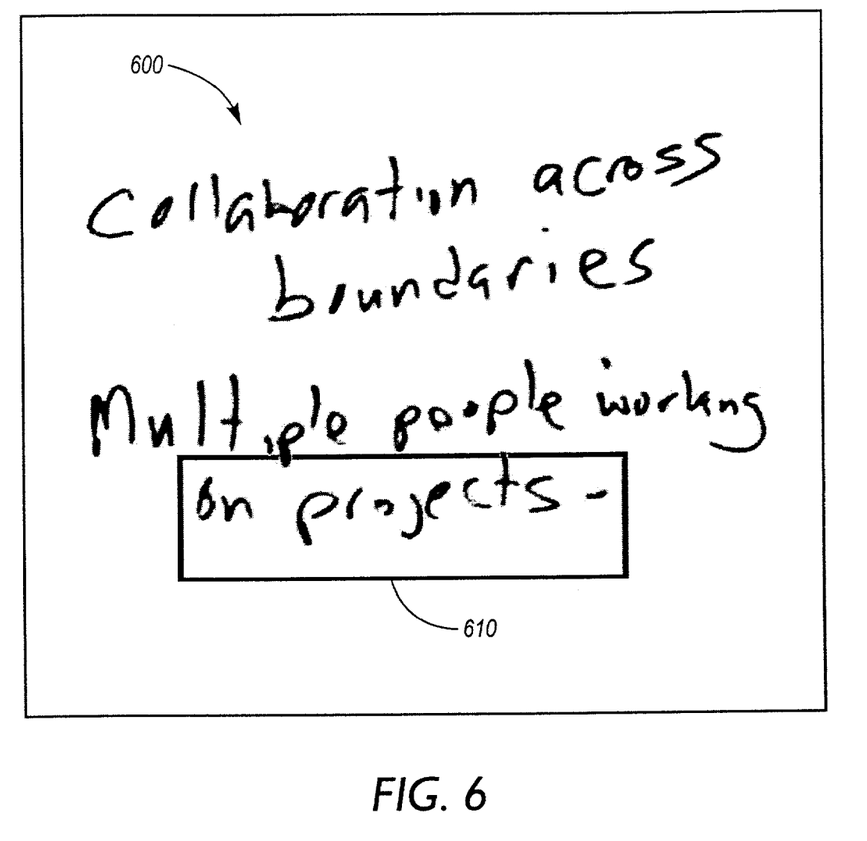
FIG. 6 illustrates interpretation of selection rectangles according to the invention.

Referring now to FIG. 6, another aspect of this invention permits the user's selection rectangles to be used not as literal definitions of regions within which image material should be selected, but as approximate specifiers of image material to be selected. FIG. 6 shows an example in which the user's selection rectangle 610 intersects characters, but in which the user's intent was likely to be to select only and entirely the characters "on projects". The embodiments of the present invention described hereinabove may be used with rectangle drag selection gestures as well as with drawn freeform paths. In place of estimates of carefulness along sections of the selection gesture, the entire boundary of the selection rectangle is assigned a value of carefulness based on the speed at which the rectangle is dragged, or else by a specific action by the user. For example, under one possible user interface design, if in the course of performing the rectangle drag the user moves the dragged corner of the rectangle back and forth several times, then the rectangle is assigned a low carefulness value (for example, 0.2) and this is used in the course of processing as described hereinabove to select or exclude image material that might fall beyond or within the rectangle's precise bounds, respectively.

While the present invention has been illustrated and described with reference to specific embodiments, further modification and improvements will occur to those skilled in the art. Although discussed with reference to text and line art, the operations illustrated herein apply equally well to any type of image object. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this invention is not limited to the particular forms illustrated and that it is intended in the appended claims to embrace all alternatives, modifications, and variations which do not depart from the spirit and scope of this invention.

What is claimed is:

1. A graphical input and display system having a user interface for selecting and arranging image object elements in a source electronic image, comprising:
   user input means for selecting and creating image objects;
   image input means for entering the electronic image onto a display means;
   a processor, connected for receiving requests for image object selection operations and for accessing a memory structure;
   program memory means comprising:
      user interaction module for selecting image objects; and
      image object selection module for interpreting imprecise image object selection paths, wherein interpreting imprecise image object selection paths comprises:
         evaluating the temporal characteristics of said object selection gesture, wherein said object selection gesture forms a bounded region; and
         evaluating the proximity of image objects to the selection gesture, comprising:
            selecting those image objects falling within an outer boundary of said bounded region;
            rejecting those image objects falling outside an inner boundary of said bounded region; and
            splitting those image objects falling across both of said inner boundary and said outer boundary of said bounded region; and
   data memory means.

2. The graphical input and display system according to claim 1, wherein said program memory further comprises a path matching module.

3. The graphical input and display system according to claim 1, wherein said program memory further comprises an object splitting module.

4. A method for utilizing a user interface on a graphical input and display system having user input means, image input means, a processor, a user interaction module for selecting image objects, an image object selection module for interpreting imprecise image object selection paths, and data memory means, comprising:

receiving a user input image object selection gesture;
evaluating the temporal characteristics of said object selection gesture, wherein said object selection gesture forms a bounded region; and
evaluating the proximity of image objects to the selection gesture, comprising:
   selecting those image objects falling within an outer boundary of said bounded region;
   rejecting those image objects falling outside an inner boundary of said bounded region; and
   splitting those image objects falling across both of said inner boundary and said outer boundary of said bounded region.

5. The method for utilizing a user interface on a graphical input and display system according to claim 4, wherein said image object selection gesture comprises a freeform path.

6. The method for utilizing a user interface on a graphical input and display system according to claim 4, wherein said image object selection gesture comprises a rectangle drag path.

7. The method for utilizing a user interface on a graphical input and display system according to claim 4, wherein said image object selection gesture comprises a polygonal selection path.

8. The method for utilizing a user interface on a graphical input and display system according to claim 4, wherein evaluating carefulness along said selection gesture comprises evaluating the proximity of groups of image objects with respect to said bounded region.

9. The method for utilizing a user interface on a graphical input and display system according to claim 8, further comprising assigning proximity category values.

10. The method for utilizing a user interface on a graphical input and display system according to claim 9, wherein assigning said proximity category values comprises:
   identifying those image objects falling within said inner boundary of said bounded region;
   identifying those image objects falling outside said outer boundary of said bounded region;
   identifying those image objects falling between said inner boundary and said outer boundary of said bounded region;
   identifying those image objects spanning said inner boundary of said bounded region;
   identifying those image objects spanning said outer boundary of said bounded region; and
   identifying those image objects spanning both said inner boundary and said outer boundary of said bounded region.

11. The method for utilizing a user interface on a graphical input and display system according to claim 10, wherein the step of evaluating the proximity of image object groups to said bounded region further comprises conducting a weighted vote of those image objects in each said image object group.

12. The method for utilizing a user interface on a graphical input and display system according to claim 11, further comprising manipulating the image objects affected by said image object selection gesture, including selecting or rejecting image objects based on the selection or rejection of image object groups.

13. The method for utilizing a user interface on a graphical input and display system according to claim 4, further comprising:
   computing boundaries between perceptual image objects;
   filtering said boundaries to retain significant boundaries; and
   performing a path-matching search to identify a modified image object selection path.

14. The method for utilizing a user interface on a graphical input and display system according to claim 13, wherein computing boundaries between said perceptual image objects comprises computing Voronoi ridges of foreground pixels.

15. The method for utilizing a user interface on a graphical input and display system according to claim 13, wherein filtering said boundaries comprises filtering Voronoi ridges to retain geometrically significant ridges.

16. The method for utilizing a user interface on a graphical input and display system according to claim 13, wherein performing a path-matching search comprises identifying a preferred path through significant Voronoi ridge segments to approximate the user's image object selection path.

17. The method for utilizing a user interface on a graphical input and display system according to claim 13, further comprising manipulating said image objects, including selecting those image objects falling in the interior of said modified image object selection path.

18. An article of manufacture comprising a computer usable medium having computer readable program code embodied in said medium which, when said program code is executed by said computer causes said computer to perform method steps for interpreting imprecise image object selection paths, said method steps comprising:
   receiving a user input image object selection gesture;
   evaluating carefulness along said selection gesture;
   forming a bounded region having an inner boundary and an outer boundary with respect to said selection gesture; and
   manipulating the image objects falling within or traversed by said image object selection gesture, wherein manipulating the image objects comprises:
      selecting those image objects falling within said outer boundary of said bounded region;
      rejecting those image objects falling outside said inner boundary of said bounded region; and
      splitting those image objects falling across both of said inner boundary and said outer boundary of said bounded region.

* * * * *